Sept. 8, 1964  M. E. McCLELLAN ETAL  3,147,577
CROP HANDLING MACHINE
Filed Dec. 14, 1962

INVENTOR.
M. E. McCLELLAN
G. R. SUTHERLAND
G. L. MYERS

United States Patent Office 3,147,577
Patented Sept. 8, 1964

3,147,577
CROP HANDLING MACHINE
Marcus E. McClellan, Gail R. Sutherland, and Glenn L. Myers, Ottumwa, Iowa, assignors to Deere & Company, Moline, Ill., a corporation of Delaware
Filed Dec. 14, 1962, Ser. No. 244,704
6 Claims. (Cl. 56—504)

This invention relates to a crop handling machine and more particularly to a harvester of the rotary type utilizing a rotor operative beneath a hood or shield for severing crops from the ground or for chopping crops previously severed.

A typical machine of this type is commercially known as a flail harvester or shredder and is commonly used for harvesting vegetation as well as for topping certain types of plants. The rotor in a machine of this character operates relatively close to the ground and at times the flails or swinging arms will actually engage the ground, picking up not only crops but also portions of soil. Since the rotor operates with relatively close clearance to the hood or shield, to keep the crops etc. from being thrown too far, it often happens that considerable portions of soil and mixtures of soil and crops adhere to the under or inner surface of the hood or shield, ultimately resulting in a "plugged" condition. Heretofore, it was necessary for the operator to stop the machine and reach under the hood with a suitable tool to dislodge the accumulation.

According to the present invention, this disadvantage is eliminated by the provision of material-releasing means operative externally of the hood. It is a significant object to provide the release means in the form of one or more bars generally parallel to the axis of the rotor and normally disposed in a position in which the accumulation is most apt to occur, these members being mounted for displacement from that position so as to dislodge the accumulation. More specifically, each member is mounted by resilient means which operates to bias the member to its normal position and which allows the member to be displaced, by means externally of the housing, to a material-dislodging position. A still further feature of the invention resides in the provision of means of the character noted which may be readily attached to machines already in existence.

The foregoing and other important objects and desirable features inherent in and encompassed by the invention will become apparent as a preferred embodiment thereof is disclosed, by way of example, in the ensuing description and accompanying sheet of drawings, the figures of which are described below.

Figure 1:
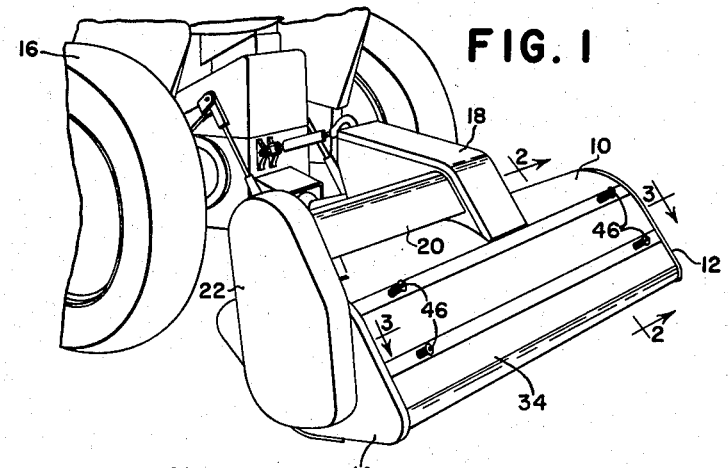
FIG. 1 is a fragmentary perspective, with portions omitted, showing a representative tractor-mounted crop-handling machine.
Figure 2:
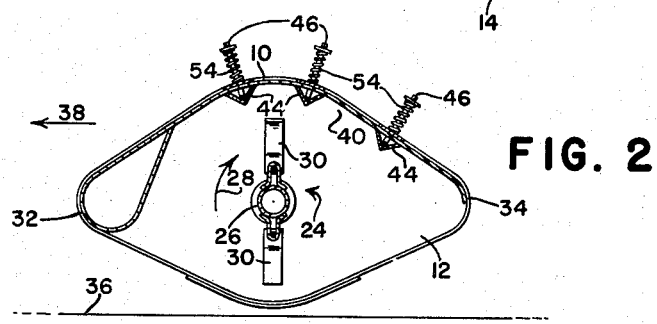
FIG. 2 is an enlarged section as seen substantially on the line 2—2 of FIG. 1.
Figure 3:
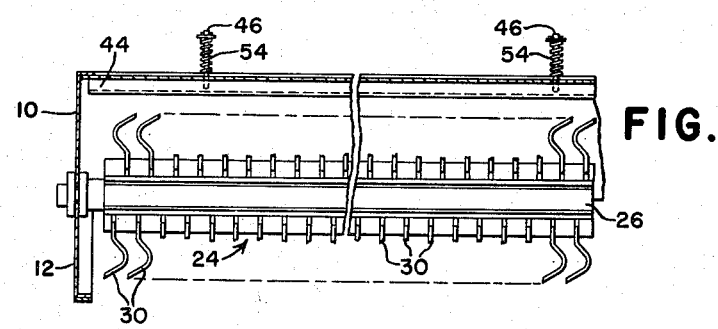
FIG. 3 is a section as seen along the line 3—3 of FIG. 1.

The machine chosen for purposes of illustration comprises a basic framework or supporting structure made up of a hood 10 of generally inverted U-shape, closed at opposite ends by end shields 12 and 14 and equipped with additional structure, including forwardly extending portions by means of which the machine may be connected to any typical three-point hitch tractor, such as that shown at 16. The hood is elongated and is disposed with its length transverse to the line of travel of the tractor. Appropriate shielding, as at 18, 20 and 22 encloses drive means (not shown) for driving a rotor 24 embraced beneath the hood 10 and including an elongated shaft 26 parallel to the length of the hood. This shaft is appropriately journaled at its opposite ends, by means not shown, for rotation in the direction of the arrow 28 as shown in FIG. 2. The rotor is of the type having a plurality of radial arms or flails 30 which, in normal operation of the rotor, stand out radially as shown.

The hood 10 has front and rear terminal edge portions 32 and 34 respectively and these are spaced above the ground (shown at 36) so that the underside of the hood may be regarded as open; that is, the rotor is exposed at the underside of the hood for operation on crops borne by the ground. As the machine advances (shown by the arrow 38 in FIG. 2), the rotor rotates in the direction of the arrow 28 and crops are severed from the ground and in the course of this operation are picked up, moved rearwardly beneath the hood 10 and are returned to the ground behind the rotor. This is particularly true in such typical operations as field shredding wherein it is desired to reduce the ground-borne crops rather than to immediately accumulate them as in the typical harvester equipped with a blower or other conveying means for carrying the material to a trailing receptacle.

A typical field over which the machine operates will be found to contain irregularities in ground contour so that on many occasions the rotor arms or flails 30 will engage not only crops but also portions of the earth, causing this material to travel upwardly and rearwardly along with the crops. Since the shredding of the crops results in considerable laceration thereof, freeing moisture therefrom, the mixture of soil and crops ultimately accumulates at the underside of the hood, particularly in the area designated by the numeral 40. Ultimately, the build-up is so great as to create a cylinder or a portion of a cylinder about the rotor, making it impossible for the rotor to transfer any more crops from the front to the rear thereof. This creates a "plugged" condition which in the past has been capable of alleviation only by stopping the machine and utilizing some form of tool to pry the accumulation from the machine.

Figure 4:
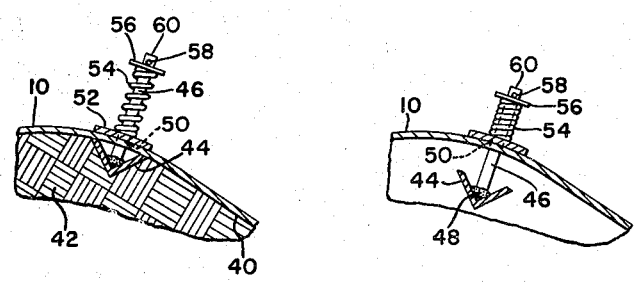
FIG. 4 is an enlarged fragmentary section showing a typical accumulation on the under surface of the hood.
Figure 5:
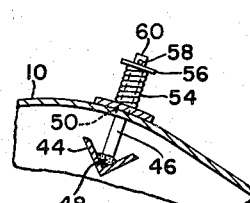
FIG. 5 illustrates the movement of the release member to material-dislodging position.

FIG. 4 illustrates a typical accumulation in the area 40, the representation of the accumulation being schematic and designated by the numeral 42. It is in this area in particular that the invention provides the material-dislodging means, here shown as comprising a pair of bars or members 44, each of which is preferably disposed with its length parallel to the length of the rotor and hood. In this case, each member 44 is in the form of an angle bar which occupies a normal position as shown in FIGS. 2 and 4. For the purpose of mounting each bar in normally fixed position, the bar is provided with a pair of outwardly extending rods or elements 46, welded to the bar as at 48 and projecting generally radially as respects the rotor and hood, the hood being appropriately provided with apertures, as at 50, to respectively receive the rods or members 46. Reinforcing bars 52 are welded in place to strengthen the hood in the areas in which the apertures 58 are provided. These bars are of course apertured to receive the rods, as will be evident. For the purpose of biasing the members outwardly, each rod is encircled by a coiled compression spring 54 which acts against the associated bar at one end and acts at its other end against a stop washer 56 pinned in place at 58 to confine the associated spring. Since the rod 46 in each case terminates exteriorly of the hood, it may be regarded as having an external control portion, here designated by the numeral 60, which is receivable of manually applied force operative to displace the member 44 from the position of FIG. 4 to that of FIG. 5. Thus, material accumulated, as at 42, will be dislodged.

It will be noted that the angle shape of each member 44 is such as to eliminate undesirable configurations to which material might otherwise adhere. Since the point of the angle is downwardly, a wedging action is effective in the material-releasing operation. Since the accumulation at 42 is normally of a relatively dense nature, it will break off in relatively large fragments. Further, the spring action effected by the biasing means or springs 54 returns the members 44 to their FIG. 4 positions, after release by the operator, as by stepping down on the control portions 60, so that a useful amount of vibration is set up in the entire hood, resulting in flaking off of further accumulations in the area under concern.

It will be seen from the foregoing that an improved material-releasing means has been provided, one that may be operated externally of the machine without the use of any special tools. A considerable factor of safety is also involved, since the operator can accomplish this task externally of the hood and need not reach in among the blades of the rotor. It will be understood that even though the rotor may be disengaged so as to discontinue its rotation, the several blades present a hazard to some extent because of their relatively sharp edges.

Features and advantages other than those set forth will readily occur to those versed in the art, as will many modifications and alterations in the preferred embodiment of the invention, all without departing from the spirit and scope thereof.

What is claimed is:

1. In a machine of the class described having a hood of generally inverted U-shape and a rotor at least partially embraced by the hood and operative to move material within the hood and to cause portions of such material at times to adhere to inner surface portions of the hood, the improvement comprising: a material-releasing member disposed at the inner surface of the hood clear of engagement with the rotor and exposed to material moved by the rotor; means mounting the member in the hood for movement relative to the hood; means operative between the member and the hood for normally holding the member in a fixed position; and means connected to the member and extending externally of the hood for moving the member to dislodge adhered material from the hood.

2. In a machine of the class described having a hood of generally inverted U-shape and a rotor at least partially embraced by the hood and operative to move material within the hood and to cause portions of such material at times to adhere to inner surface portions of the hood, the improvement comprising: a material-releasing member disposed at the inner surface of the hood clear of engagement with the rotor and exposed to material moved by the rotor; means mounting the member in the hood for movement relative to the hood including a mounting element connected to the member and having a control part external to the hood; and biasing means operative between the member and the hood for normally holding the member away from the rotor and toward the hood, said control part being receivable of manual force to move the member against the biasing means so as to dislodge adhered material from the hood.

3. In a machine of the class described having a hood of generally inverted U-shape and a rotor at least partially embraced by the hood and operative to move material within the hood and to cause portions of such material at times to adhere to inner surface portions of the hood, the improvement comprising: a plurality of material-releasing members disposed at the inner surface of the hood clear of engagement with the rotor and exposed to material moved by the rotor; means mounting the members in the hood for movement relative to the hood; means operative between the members and the hood for normally holding the members in fixed positions; and means connected to the members and extending externally of the hood for moving the members to dislodge adhered material from the hood.

4. In a machine of the class described having a hood of generally inverted U-shape and a rotor at least partially embraced by the hood and operative to move material within the hood and to cause portions of such material at times to adhere to inner surface portions of the hood, the improvement comprising: a plurality of material-releasing members disposed at the inner surface of the hood clear of engagement with the rotor and exposed to material moved by the rotor; means mounting the members in the hood for movement relative to the hood including, for each member, a mounting element connected to said member and having a control part external to the hood; and biasing means operative between the member and the hood for normally holding the member away from the rotor and toward the hood, said control parts being receivable of manual force to move the members against the biasing means so as to dislodge adhered material from the hood.

5. In a machine of the class described having a hood of generally inverted U-shape and a rotor at least partially embraced by the hood and operative to move material within the hood and to cause portions of such material at times to adhere to inner surface portions of the hood, the improvement comprising: a plurality of material-releasing members disposed at the inner surface of the hood clear of engagement with the rotor and exposed to material moved by the rotor, each member having a rod rigid therewith and projecting outwardly through the hood in a generally radial direction as respects the rotor, said hood being apertured to receive the rods and said rods respectively having outer end portions; means including a plurality of springs, one for each rod, engaged between the hood and the outer ends of the rods for holding the members toward the inner surface of the hoods, each spring being yieldable upon the application of manual force inwardly to its respective rod to move its respective member toward the rotor so as to dislodge adhered material from the hood.

6. In a machine of the class described having a shield-like element and a rotor closely adjacent to the element and operative to move material past said element and to cause portions of such material at times to adhere to the element, the improvement comprising: a material-releasing member disposed at the rotor-proximate surface of the element clear of engagement with the rotor and exposed to material moved by the rotor; means mounting the member on the element for movement relative to the element; means operative between the member and the element for normally holding the member in a fixed position; and means connected to the member and extending externally of the element for moving the member to dislodge adhered material from the element.

References Cited in the file of this patent

UNITED STATES PATENTS

| | | |
|---|---|---|
| 317,971 | Carrothers | May 19, 1885 |
| 2,633,687 | Bannister | Apr. 7, 1953 |
| 2,656,662 | Hines | Oct. 27, 1953 |